March 4, 1958 — C. M. QUIST — 2,825,301
HORSE TRAILER
Filed Aug. 6, 1956
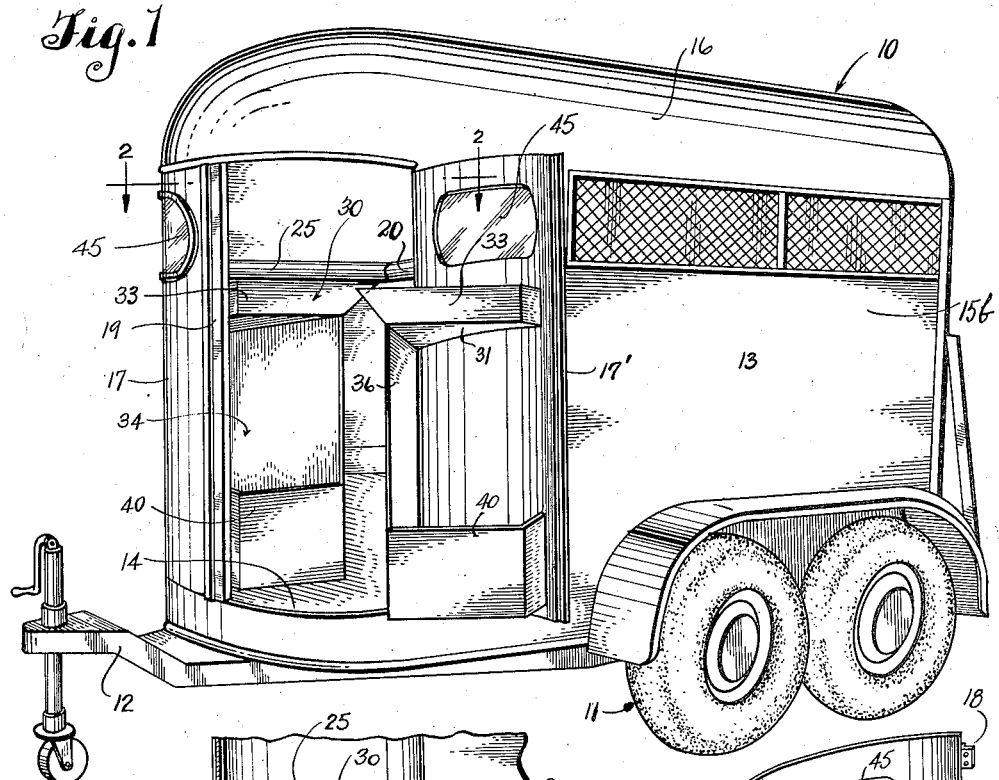
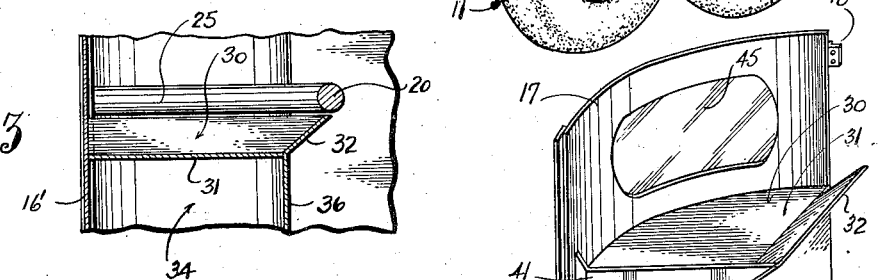
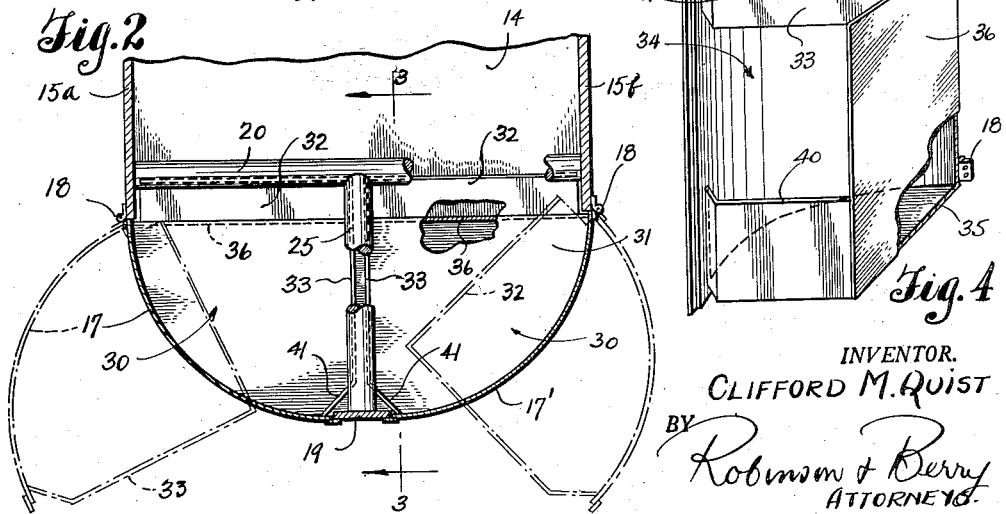
INVENTOR.
CLIFFORD M. QUIST
BY Robinson & Berry
ATTORNEYS United States Patent Office 2,825,301
Patented Mar. 4, 1958

2,825,301

HORSE TRAILER

Clifford M. Quist, Puyallup, Wash.

Application August 6, 1956, Serial No. 602,137

4 Claims. (Cl. 119—15)

This invention relates to improvements in vehicles which are generally designated as "horse trailers," and it has reference more particularly to those types of wheel mounted horse trailers adapted to be connected to and towed by an automobile, and which are equipped at their forward ends, with one or more normally closed doors which are adapted to be opened forwardly for easy access to the horse housed in the trailer.

It is the principal object of this invention to provide such forwardly opening door or doors of horse trailers with an improved form of feed box and equipment storage compartment structure that will be more readily accessible to the attendant from the outside of the trailer than is provided in present day horse trailers.

More specifically stated, the primary object of the invention is to provide a horse trailer of the above character with forwardly opening doors closing the forward end of the trailer, and to equip these doors, at the inside thereof, with feed boxes and storage compartments that will be swung with the doors as they are opened, to positions outside and forwardly of the trailer, out of reach of the horse, and most conveniently accessible to the horse attendant.

It is a further object of the invention to so arrange the feed boxes and storage compartments on the doors relative to certain cross-bracing at the head of the horse stall that, when these doors are closed, the boxes and compartments will be protected against damage by any forward lurching of the horse for any reason.

Yet another object of the invention is to so arrange the storage compartments on the doors that, when the doors are opened, a full width "walk through" passage will be provided.

Further objects and advantages of the invention reside in the details of construction, combination and relationship of parts, and in their mode of use as will hereinafter be fully described.

In accomplishing the above mentioned and other objects of the present invention, I have provided the improved details of construction, the preferred forms of which are illustrated in the accompanying drawings, wherein:

Fig. 1 is a perspective view of a horse trailer in which the improvements of the present invention have been embodied; the near front end door of the trailer being shown in an open position.

Fig. 2 is a horizontal section of the forward end portion of the trailer, taken substantially on line 2—2 in Fig. 1, showing the relative position of doors and feed boxes to the transverse brace when the doors are closed.

Fig. 3 is an enlarged vertical section, taken on line 3—3 in Fig. 2, showing the relative position of brace beams and feed boxes when the doors are closed.

Fig. 4 is a perspective view, showing a feed box and storage compartment mounted on the inside of a door.

Referring more in detail to the drawings:

In Fig. 1, I have shown a typical form of horse trailer in which the present invention has been embodied; the trailer being designated in its entirety by reference numeral 10. In this instance the trailer is shown as being mounted for transportation on a tandem wheeled truck 11 which, at its forward end is equipped with a draft bar, or tongue 12, for its attachment for towing by a motorized vehicle.

The trailer 10 here shown comprises a van type body 13, floor 14, opposite sidewalls 15a and 15b, as seen in Fig. 2, and top 16. At its forward end, the body is closed by a pair of doors 17 and 17' which are here shown as being hinged at their outer edges, as at 18, to the walls 15a and 15b, to swing between open and closed positions, the swinging edges of the doors being adapted to close against a post 19 that extends vertically between floor and top of the body. In Fig. 2, the doors have been shown in dotted lines in partly open positions.

Extended between the opposite sidewalls within the forward end portion of the body 13, is a heavy, substantial cross-bar 20 here shown as being round in cross-section. This bar is securely fixed at its ends to the sidewalls and is capable of withstanding any pressure of the horse's body thereagainst as might be caused by the lurching of the horse or due to any sudden stop of the trailer while transporting the horse therein. This bar is located approximately at shoulder level. Rearward of the bar 20 is the stall, which may be single or double.

It is to be noted that the forward end of the vehicle body, as defined by the paired doors, is forwardly curved, substantially to a semi-circular form. Also, it is to be noted by reference to Figs. 2 and 3 that a horizontal brace bar 25 extends in the central longitudinal plane of the vehicle, between the bar 20 and the post 19. This bar serves as a brace both for bar 20 and post 19.

The present invention is characterized by the bracing and by the mounting of a feed box and storage compartment structure on the inside of each door; these parts being so arranged that they do not interfere with each other or the bracing in swinging the doors between open and closed position and provide further that when the doors are open, an attendant can have convenient and easy access thereto from outside the vehicle. It is noted in Fig. 4 that the feed box 30 is formed at the top of the structure. It has a bottom 31; a rearwardly and upwardly sloping wall 32 at the stall side that joins at its inner end with a vertical sidewall 33 that leads forwardly to the supporting door and joins therewith adjacent its swinging edge, as best shown in Fig. 4. This feed box is at a level which affords easy access thereto by the horse when feeding therefrom in the normal way.

Directly below each feed box 30, as carried on a door, is a storage compartment 34 for equipment such as, for example, harness, saddle blankets or the like. The bottom 31 of the feed box forms the top of this compartment and each compartment also has a horizontal bottom wall 35, an inside wall 36 that extends from the hinged edge of the door to the center line of the body as shown in Fig. 2. Thus when the doors are closed, the inside walls 36 of the two storage compartments provide a closed wall across the head of the stall below the cross bar 20, reaching the full distance between feed box and floor of the trailer.

Across the lower part of each compartment, as defined between the door and the inside wall 26, the compartment is partly closed by a vertical wall 40. This wall leaves an opening of substantial size between its top edge and the bottom of the feed box above it. Parts of the wall 40 and feed box wall 33 directly above it, are angled adjacent their connection with the door, as at 41 in Fig. 2, so that they will clear the post 19 when the doors are swung between closed and open positions.

It is desirable that the two doors be provided with windows, as at 45, above the feed box level as shown. Door mounting hinges of any suitable kind may be employed, and also any suitable form of latch or hasp can be used on the doors to lock them in closed positions.

The arrangement of forward end doors as here shown is now preferred by me. However, it may be desirable in some instances to provide trailers of this kind with single doors, located at either side or at the center of the forwardly curved forward end wall and equip them with feed box and storage compartments as shown.

The provision of the cross brace 20 will serve to protect the doors and also the feed box structure from damage by the horse.

One of the most important features of the present invention resides in the fact that, by the present arrangement of doors, easy head end access to the horse is provided for. Also, easy escape from the stall is afforded should it become necessary. There is no narrow, restricted escape passage between fixed mangers as in some trailers, but an unrestricted passage to the full width of the trailer.

Easy access to the storage compartments from outside the trailers is provided for upon opening the doors, and this does not permit exit of the horse. Also feed boxes can be cleaned and filled from outside the trailer and without any interference by the horse.

Such trailers also may have the usual stall and rear end facilities such as tail gates, ramps for loading, breach straps, etc.

Size, shape and arrangement of doors might be altered to some extent without departing from the spirit of the invention, and for this reason it is not desired that the claims be confined only to details shown but that they be given an interpretation that is commensurate to the invention disclosed.

What I claim is:

1. A horse trailer comprising a van type body structure enterable from its near end, a horizontal cross-bar fixed in said body within its forward end portion and setting of an animal stall rearwardly thereof and an equipment area forwardly thereof, said body structure being equipped at its forward end with a pair of doors hinged at their outer vertical edges to opposite side walls of the body structure for swinging forwardly and laterally from positions at which they close the forward end of the body to positions whereby that end of the body is opened to its full width and thus provides, except for said cross-bar, an unobstructed view through the body structure from its entering end through its forward open end.

2. A horse trailer comprising a van-type body structure providing a stall enterable from the rear end of the body structure and headed toward the forward end of said body structure, a cross-bar fixed in the body structure defining the forward limits of the stall and setting off an enclosed area forwardly of the stall; said body structure being equipped at its forward end with a pair of doors, hinged at their outer vertical edges, each to open forwardly and laterally to provide an entry to and an exit from said enclosed area, and each of said doors having a feed box structure mounted on the inside thereof to swing from a position within said enclosed area, adjacent the head end of the stall space to a position entirely outside the body structure with the opening of the door; said cross-bar being fixedly supported at the level of the feed box structures as mounted on said doors, and said feed box structures, as mounted on said doors being supported thereby closely adjacent the forward side of the cross-bar when the doors are closed.

3. A horse trailer as recited in claim 2 wherein said body structure comprises a vertical post, located at its forward end and in its central longitudinal plane, and wherein said cross-bar is fixedly supported from the opposite side walls of the body structure, and said pair of doors are so hinged on the body side walls as to swing toward and away from said vertical post and together to provide a substantially semicircular and forwardly rounded forward end wall for the body structure when closed, and each provides an exit to its full width when open.

4. A horse trailer as recited in claim 3 wherein the feed box structure as applied to each door comprises an upwardly opening feed box at the level of the cross rail, and an accessory storage compartment below the feed box; said storage compartment being fully closed by a vertical wall at the stall side thereof.

References Cited in the file of this patent

UNITED STATES PATENTS

| | | |
|---|---|---|
| D. 149,786 | Arisman | June 1, 1948 |
| 1,338,077 | Hector | Apr. 27, 1920 |
| 2,659,344 | Herbert | Nov. 17, 1953 |